Patented July 21, 1931

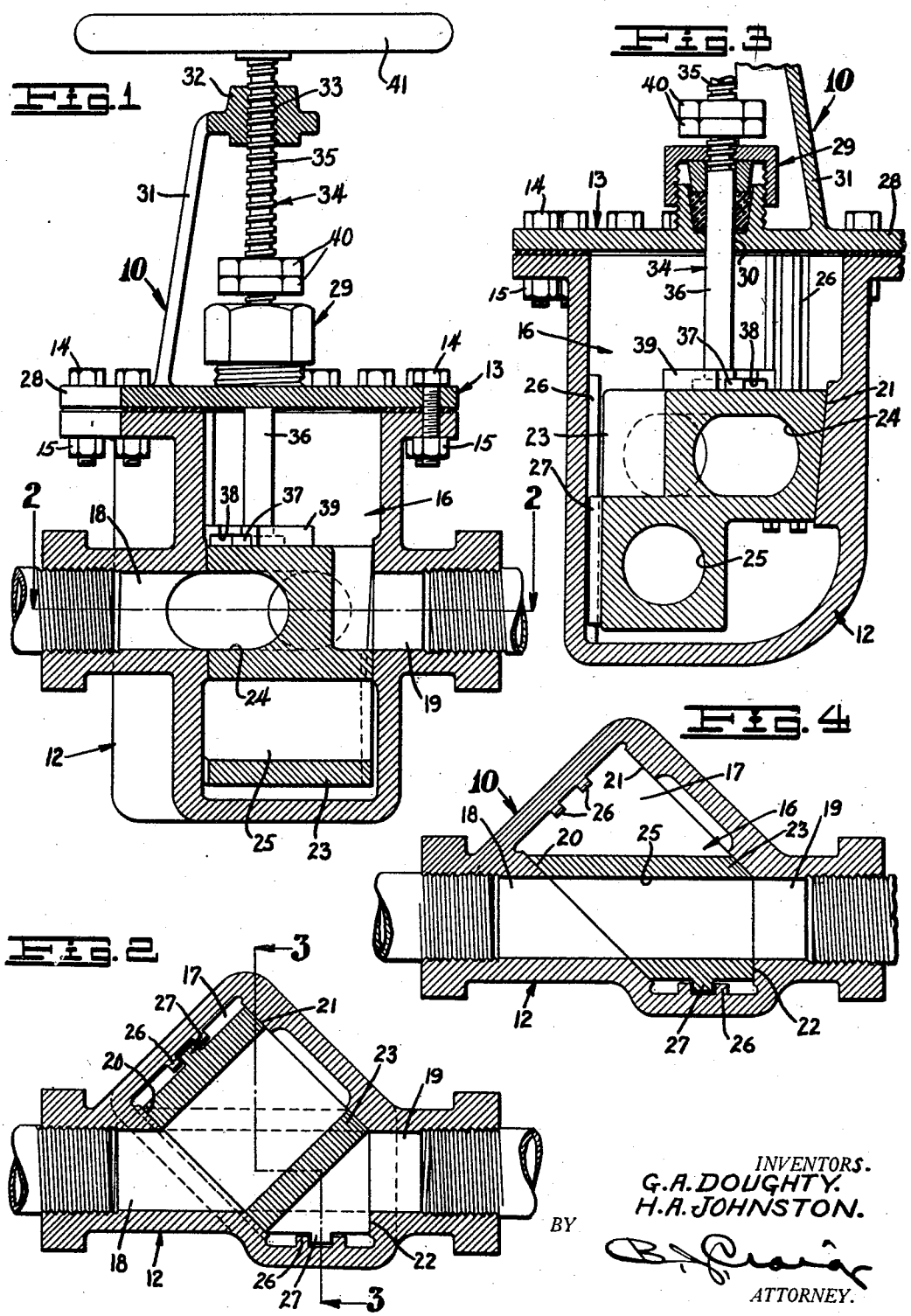

1,815,349

UNITED STATES PATENT OFFICE

GLENN A. DOUGHTY AND HERBERT A. JOHNSTON, OF ANAHEIM, CALIFORNIA

BALANCED HIGH PRESSURE VALVE

Application filed May 3, 1930. Serial No. 449,437.

This invention relates to valves.

The general object of the invention is to provide an improved high pressure valve.

A further object of the invention is to provide a valve having an inlet and an outlet and having a movable closure, including a bore which in closed position causes the fluid to impinge against the inner wall of the valve.

A further object of the invention is to provide a valve having an inlet and an outlet and having a closure with a pair of bores therethrough, wherein the inlet communicates with one of said bores when the closure is in one position, and communicates with the other of said bores when the closure is in another position.

Other objects and advantages of this invention will be apparent from the following description taken in connection with the accompanying drawings wherein:

Fig. 1 is a central longitudinal section through our improved valve.

Fig. 2 is a section taken on line 2—2 of Fig. 1.

Fig. 3 is a section taken on line 3—3 of Fig. 2, and

Fig. 4 is a section similar to Fig. 2 showing the valve in an open position.

Referring to the drawings by reference characters we have indicated our improved valve generally at 10. As shown this valve comprises a body portion 12 and a cap 13 secured thereto by a plurality of bolts 14 and nuts 15. The body includes a chamber 16 having a portion 17, the axis of which is arranged at an angle to the inlet 18 and the outlet 19. The inlet and outlet are in axial alignment and the inlet 18 opens into the angular portion 17 of the chamber. Surrounding the inner end of the inlet we provide a seat portion 20 and opposite the seat 20 and coaxial therewith we provide a seat portion 21 which is on the wall of the chamber 17.

The planes of the seats 20 and 21 are inclined relative to each other, being farthest apart at their upper ends and converging toward each other at their lower ends. A portion of the seat 21 forms a part of a seat surrounding the outlet while the remainder is formed by a straight portion 22.

Positioned in the chamber 16 we provide a closure member 23 which includes a bore 24 and a second bore 25. The bore 24 in closed position of the closure member is coaxial with the inlet seat 20 and the axis of the bore is coaxial with the inlet 18 and the outlet 19.

The nuts 40 are adapted to be adjusted to a position on the stem whereby when the nuts engage the underside of the boss 32 the closure bore 25 registers with the inlet and outlet.

When the fluid is directed through the valve 10 in a direction opposite to that indicated by the arrow and the closure 23 is in a position to restrict flow through the valve, the fluid enters the chamber 16 and completely surrounds the closure. The fluid pressure is then equally distributed over all surfaces of the closure except the portions engaging the seats 29 and 21. Thus the fluid pressure does not hinder opening of the valve.

In making the valve 10 for some purposes the lower portion of the closure 23 which includes the bore 25 may be omitted if desired. If thus constructed the valve actuates to restrict flow therethrough in the same manner and when opened the fluid passes from the inlet to the chamber 16 and thence out through the outlet.

From the foregoing description it will be apparent that we have provided a novel valve which is particularly adapted for high pressure use and which is simple in construction and is highly efficient in use.

On the body 12 in the chamber 16 we may provide guide rails 26 in which tongues 27 on the closure 23 are adapted to be positioned.

The cap 13 includes a base 28 having a packing gland 29 thereon surrounding an aperture 30 and a plurality of lugs 31 which terminate in a boss 32 having a threaded aperture 33 therein. For moving the closure member 23 we provide a stem 34 which includes a threaded portion 35 positioned in the threaded aperture 33 and a cylindrical portion 36 which extends through the packing gland 29 and the aperture 30 and terminates in an enlarged head 37 which is positioned in an undercut groove 38 provided in a boss 39 on the closure.

For limiting the upward movement of the stem 34 we provide a plurality of lock nuts 40 and for rotating the stem we have shown a hand wheel 41 secured thereto, but it will be understood that any other suitable means may be used to rotate the stem.

When the valve 10 is operatively installed in a fluid conduit system with the fluid directed through the valve from left to right in Fig. 1 and the closure 23 is in a lowered position as shown in Figs. 1, 2 and 3, the closure engages the seats 20 and 21 and the bore 24 registers with the inlet 18, thereby forming a passageway from the inlet through the closure to the opposite wall of the chamber which forms a dead end and thus restricts the flow of fluid through the valve. The radial pressure within the bore 24 being equal in all directions and the ends of the bore 24 which contact with the seats 20 and 21 being equal, all the pressures are balanced so that no fluid pressure hinders opening of the valve.

By this construction the fluid passes through the closure and the pressure on the closure is so distributed that it allows the closure to be moved easily and readily.

To open the valve the closure 23 is moved upward until the closure bore 25 registers with the inlet 18 and the outlet 19, whereupon an unobstructed passageway is formed through the closure from the inlet to the outlet, as shown in Fig. 4.

What we claim is:

1. A valve including a body having an inlet and an outlet, a closure member in said body, said closure including spaced bores, one of said bores in one position of said closure forming a passage to a dead end and the other bore when said closure is in another position forming a passage from said inlet to said outlet.

2. A valve, said valve including a body portion, a chamber in said body, an inlet in said body communicating with said chamber, a seat portion surrounding said inlet, the plane of said inlet seat being arranged at an angle to the axis of said inlet, a second seat portion opposite said inlet seat and parallel thereto, said second seat surrounding a portion of said body wall, a closure member positioned in said chamber, said closure member having a bore, said bore in one position of said closure being adapted to register with said inlet opening at one end and said second seat at the opposite end.

3. In a valve, a body having an inlet and an outlet, a seat portion surrounding said inlet, the plane of said inlet seat being arranged at an angle to the axis of said inlet, a second seat portion opposite said inlet seat and parallel thereto, said second seat surrounding a portion of said body wall.

4. A valve, said valve including a body portion having an inlet, a seat surrounding said inlet, said body having an outlet, a second seat portion opposite said inlet seat, said second seat surrounding a portion of said body wall, a closure member positioned in said chamber, said closure member having a bore, said bore in one position of said closure being adapted to register with said inlet opening at one end and said second seat at the opposite end.

5. A valve including a body portion, a cap removably secured to said body, a chamber in said body, an inlet in said body communicating with said chamber, a seat portion surrounding said inlet, a seat portion surrounding said outlet, the plane of said inlet seat arranged at an angle to the axis of said inlet, a third seat portion opposite said inlet seat and arranged parallel to said inlet seat, said third seat surrounding a portion of said body wall, a closure member positioned in said chamber, said closure having a bore, said bore in one position of said closure being adapted to register with said inlet opening at one end and said third seat at the opposite end, a second bore in said closure, said second bore when said first bore is out of register with said inlet being adapted to register with said inlet and outlet and form a passageway from the inlet to the outlet.

6. In a valve, a body having an intermediate chamber and an inlet and an outlet communicating with said chamber, said inlet and said outlet being in axial alignment and said chamber having its axes arranged at an acute angle relative to the axis of said inlet, a closure member mounted to move in said chamber, said closure member comprising a body having a bore, said bore being inclined relative to the axis of said inlet, said bore being of the same cross sectional area as the area of said inlet, said closure member in one position being disposed whereby the bore thereof is at one end in alignment with said inlet with the other end of the bore adjacent the body whereby fluid pressure in said inlet impinges on said body, a second bore on said valve member, said second bore in another position of said valve being in alignment with said inlet and said outlet whereby passage from said inlet to said outlet is unimpeded.

7. In a valve, a body having an intermediate chamber and an inlet and an outlet communicating with said chamber, said inlet and said outlet being in axial alignment and said chamber having its axes arranged at an acute angle relative to the axis of said inlet, a closure member mounted to move in said chamber, said closure member comprising a body having a bore, said bore being inclined relative to the axis of said inlet, said bore being of the same cross sectional area as the area of said inlet, said closure member in one position being disposed whereby the bore thereof is at one end in alignment with said inlet and with the other end of the bore adjacent the inner wall of the body whereby fluid pressure in said inlet impinges on the wall of said body, said valve member in another position having the bore remote from said inlet whereby passage from said inlet to said outlet is unimpeded.

8. A valve comprising a body having a chamber therein and having an inlet communicating with said chamber and an outlet opposite said inlet and communicating with said chamber, a seat portion surrounding said inlet, a seat portion surrounding said outlet, the plane of said inlet seat being arranged at an angle to the axis of said inlet, a third seat portion opposite said inlet seat and parallel thereto, said third seat surrounding a portion of said body wall, a closure member positioned in said chamber and having a bore, said bore in one position of said closure being adapted to register with said inlet opening at one end and said third seat at the opposite end, said closure member having a second bore, said second bore when said first bore is out of register with said inlet being adapted to register with said inlet and outlet and form a passageway from one to the other.

9. A valve, said valve comprising a body portion, a cap removably secured to said body, a chamber in said body, an inlet in said body communicating with said chamber, an outlet in said body opposite said inlet and communicating with said chamber, a seat portion surrounding said inlet, a seat portion surrounding said outlet, the plane of said inlet seat being arranged at an angle to the axis of said inlet, a third seat portion opposite said inlet seat and parallel thereto, said third seat surrounding a portion of said body wall, a closure member positioned in said chamber and having a bore, said bore in one position of said closure being adapted to register with said inlet opening at one end and said third seat at the opposite end, said closure having a second bore, said second bore when said first bore is out of register with said inlet being adapted to register with said inlet and outlet and form a passageway from one to the other, a plurality of legs on said cap, a threaded boss supported by said legs, a packing gland on said cap, a stem, said stem including a threaded portion and a cylindrical portion having an enlarged head thereon, said threaded portion being positioned in said threaded boss, said cylindrical portion extending through said packing gland, said head being rotatably connected to said closure and means on said stem to rotate said stem.

In testimony whereof, we hereunto affix our signatures.

GLENN A. DOUGHTY.
HERBERT A. JOHNSTON.